Oct. 2, 1945.    H. M. STEPHENSON    2,386,071
CLUTCH CONSTRUCTION
Filed July 8, 1944

Inventor:
Hugh M. Stephenson,
by Harry E. Dunham
His Attorney.

Patented Oct. 2, 1945

2,386,071

UNITED STATES PATENT OFFICE 2,386,071

CLUTCH CONSTRUCTION

Hugh M. Stephenson, Fort Wayne, Ind., assignor to General Electric Company, a corporation of New York Application July 8, 1944, Serial No. 544,070

11 Claims. (Cl. 192—105)

This application is directed to a clutch construction and particularly to the type clutch which is adapted to provide a predetermined lag to permit a drive shaft to reach a predetermined speed before transmitting forces through the clutch.

An object of my invention is to provide an improved lag clutch construction.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
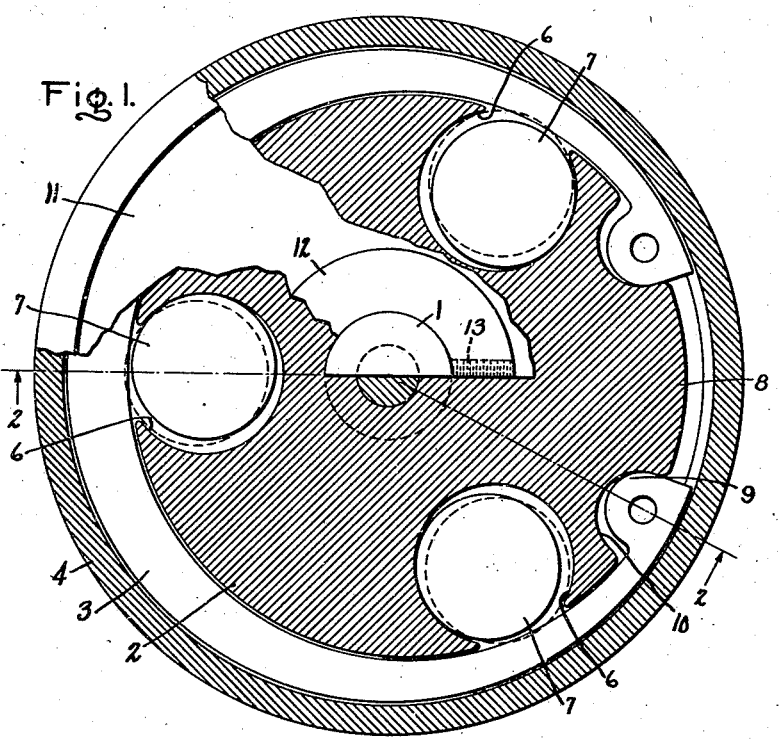
Figure 2:
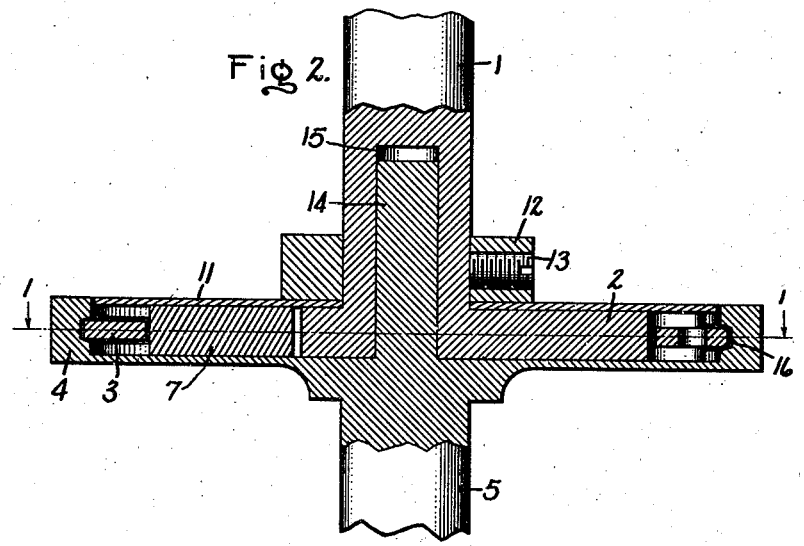

In the drawing, Fig. 1 is an end elevational view, partly broken away and shown in section along line 1—1 of Fig. 2; and Fig. 2 is a partial sectional view taken along line 2—2 of Fig. 1.

Referring to the drawing, I have shown an embodiment of my improved lag clutch construction which includes a drive member having a drive shaft 1 to which an eccentrically arranged drive plate 2 is secured. The drive plate 2 is adapted to actuate an arcuate spring 3 into frictional driving engagement with the inner surface of a drum 4 which forms part of a driven member and is secured to a driven shaft 5. The spring 3 is of the type in which the circular inner and outer peripheral surfaces are eccentric relative to each other such that the radial width of the spring varies inversely with the circumferential distance from the midpoint circumferentially of the spring in order to provide for maintenance of a substantially circular inner and outer periphery of the spring for wide variations in its stressed condition. In order to provide the desired drive, the drive plate 2 is formed with a plurality of circumferentially spaced apart substantially circular pockets 6 which are open to the outer periphery of the drive plate and in each of which a substantially circular or cylindrical weight member 7 is loosely arranged. These weight members are of smaller diameter than the diameter of the circular pockets 6 to provide for a limited amount of movement of the weights within the pockets. The drive plate 2 also is formed with a driving projecting part 8 which is arranged intermediate the ends of the spring 3 which are circumferentially spaced apart and which are formed with inwardly projecting driving parts 9 arranged on each side of the drive plate projecting part 8 and extending into notches 10 in the outer periphery of the drive plate. This assembly of the drive plate 2, the spring 3, and the weights 7 extends into the drum 4 and is held in assembled relationship by a closure plate 11 which is arranged about the shaft 1 and is held in position by a ring 12 secured to the shaft 1 by a setscrew 13. In order to maintain the two shafts in axial alignment, the end 14 of the driven shaft 5 is formed on a smaller diameter and is journaled in a hollow end portion 15 of the shaft 1. The weights 7 are constructed and arranged to be retained in the pockets of the drive member plate 2, such that the inertia of the weights holds them in the pockets to one side and out of contact with the arcuate spring 3 during the period of acceleration of the drive member plate. This position is illustrated in Fig. 1 in solid lines for a counterclockwise rotation of the drive plate 2. The construction of the weights is such that during a uniform speed of rotation, centrifugal force biases the weights outwardly into contact with the inner surface of the spring 3, as shown in dotted lines in Fig. 1, for assisting the action of centrifugal force on the spring 3 for biasing the spring into driving frictional engagement with the inner surface of a groove 16 formed on the inner surface of the drum 4. This provides a driving connection between the drive plate 2 and the drive shaft drum 4 through the spring 3 by the engagement of the drive plate driving part 8 with an end 9 of the spring 3 and the engagement of the spring 3 with the surface of the groove 16 in the drum 4.

The arrangement of the weights 7 in circumferentially spaced apart relationship provides for a uniform expanding force on the spring 3 in addition to the centrifugal force on the spring, and tends to provide for a more uniform and smooth acting clutch. In this arrangement, the friction of the leading end of the spring 3 when in contact with the drum causes it to tend to expand further by a positive snubbing into the driven drum surface. This further increases the tendency of the spring to expand and locks the entire assembly into a firm driving connection which rotates as a solid unit for all uniform loads above a predetermined speed. If the torque requirement of the load is increased to such an extent as to produce an overload on the drive member which decreases the speed of the unit, the centrifugal force on the weights 7 will be decreased, and thereby the pressure of these weights on the ring 3 will be relieved to a value such that the leading end of the spring will lose its self-energizing function and slipping will occur between the driving and driven members, thus assuring against destructive forces due to excessive overload on the drive member. Such action is augmented due to the fact that on sudden deceleration of speed caused by an excessive overload demand, the weights being free, will roll to the leading edge of their respective pockets and entirely remove their radial pressure on the spring ring 3, thus causing the ring to release the load as hereinafter described. Should the load remain at this torque value, the clutch will work in a pulsating manner, tending alternately to drive the load and then to release the load until the drive member again accelerates and again picks up the load, repeating the cycle under the action of the freely movable weights. Another feature of this clutch construction is that if the initial torque required to start the driven load is excessive, the clutch will operate in the foregoing pulsating manner until the load has been accelerated by intermittent driving forces to a normal running speed at which the weights 7 will be maintained in contact with the spring 3 and the spring 3 in contact with the driven drum 4. This is very useful for certain applications, as where the drive member may be an electric motor and it is desired to limit the starting current of the motor to a relative safe maximum value.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent in the United States is:

1. A lag clutch including a driven member, a drive member, a spring arranged in radially spaced relationship between both of said members and constructed and arranged for providing a frictional driving connection between said driven and said drive members, and means including weights constructed and arranged to be retained in said drive member such that the inertia of said weights holds said weights out of contact with said spring when said drive member is being accelerated and such that centrifugal force biases said weights outwardly during a uniform speed of rotation into contact with said spring for biasing said spring to provide said driving connection between said drive member and said driven member through said spring up to a predetermined maximum torque.

2. A lag clutch including a driven member, a drive member, a spring arranged in radially spaced relationship between both of said members, and means including weights constructed and arranged to be retained in said drive member such that the inertia of said weights holds said weights in said drive member out of engagement with said spring when said drive member is being accelerated below a predetermined speed and such that centrifugal force biases said weights outwardly above a predetermined uniform speed of rotation into engagement with the inner surface of said spring for biasing said spring into driving frictional engagement with said driven member for providing a driving connection between said drive member and said driven member through said spring.

3. A lag clutch including a drive member with a drive plate secured thereto and having a driving part thereon, a driven member having a drum extending in radially spaced relationship about said drive plate, and an arcuate spring arranged in the radial space between said drive plate and said drum with a slight radial clearance from each, the ends of said arcuate spring being circumferentially spaced apart and arranged for driving engagement with said drive plate driving part, said spring being constructed and arranged out of engagement with said drum when said drive plate is rotated below a predetermined speed and such that centrifugal force biases said spring outwardly above a predetermined speed of rotation into engagement with the inner surface of said drum for providing a driving connection between said drive plate and said driven member drum through said spring below a predetermined torque.

4. A lag clutch including a drive member formed with a pocket open outwardly and having a driving part thereon, a weight member loosely arranged in said pocket, a driven member having a drum extending in radially spaced relationship about said drive member pocket, and an arcuate spring arranged with its ends circumferentially spaced apart and having driving parts arranged for driving engagement with said drive member driving part, said weight being constructed and arranged in said pocket such that the inertia thereof holds said weight in said pocket out of engagement with said spring when said member is being accelerated below a predetermined speed and such that centrifugal force biases said weight outwardly above a predetermined uniform speed of rotation into engagement with the inner surface of said spring for biasing said spring outwardly to provide a frictional driving connection between said drive plate and said driven shaft drum through said spring below a predetermined torque.

5. A lag clutch including a driven member having a drum, a drive member extending into said drum and having a driving part, a spring having a radial width which varies inversely with the circumferential distance from the midpoint circumferentially of the spring arranged in radially spaced relationship between said drum and said drive member and having spaced apart ends arranged for driving engagement with said drive member driving part, and means including weights constructed and arranged to be retained in said drive member such that the inertia of said weights holds said weights in said drive member out of contact with said spring when said drive member is accelerated below a predetermined speed and such that centrifugal force biases said weights outwardly above a predetermined speed of rotation into contact with the inner surface of said spring for biasing said spring into driving frictional engagement with the inner surface of said drum for providing a driving connection between said drive member and said driven member drum through said spring.

6. A lag clutch including a drive shaft with means formed with a pocket open outwardly and having a driving projecting part thereon, a weight member loosely arranged in said pocket, a driven shaft having a drum secured thereto extending in radially spaced relationship about said drive shaft means pocket, and an arcuate spring arranged with its ends circumferentially spaced apart and having driving parts projecting therefrom arranged on each side of said drive shaft driving projecting part, said weight being constructed and arranged in said pocket such that the inertia thereof holds said weight in said pocket out of engagement with said spring when said drive shaft is being accelerated below a predetermined speed and such that centrifugal force biases said weight outwardly above a predetermined speed of rotation into engagement with the inner surface of said spring for biasing said spring into driving frictional engagement with the inner surface of said drum for providing a driving connection between said drive plate and said driven shaft drum through said spring below a predetermined torque.

7. A lag clutch including a drive shaft with an eccentrically arranged drive plate secured thereto and formed with a pocket therein open to the outer periphery of said plate and having a driving projecting part thereon, a weight member loosely arranged in said pocket, a driven shaft having a drum secured thereto extending in radially spaced relationship about said drive plate and being substantially coaxial with said drive shaft, and an arcuate spring arranged in the radial space between said drive plate and said drum with a slight radial clearance from each, the ends of said arcuate spring being circumferentially spaced apart and having driving parts projecting therefrom arranged on each side of said plate driving projecting part, said weight being constructed and arranged in said pocket such that the inertia thereof holds said weight in said pocket out of engagement with said spring when said drive plate is being accelerated below a predetermined speed and such that centrifugal force biases said weight outwardly above a predetermined speed of rotation into engagement with the inner surface of said spring for assisting centrifugal force on said spring in biasing said spring into driving frictional engagement with the inner surface of said drum for providing a driving connection between said drive plate and said driven shaft drum through said spring.

8. A lag clutch including a drive member with a drive plate secured thereto and formed with a plurality of circumferentially spaced apart pockets therein open to the outer periphery of said plate and having a driving projecting part thereon, a weight member loosely arranged in each of said pockets, a driven member having a drum extending in radially spaced relationship about said drive plate, and an arcuate spring arranged in the radial space between said drive plate and said drum with a slight radial clearance from each, the ends of said arcuate spring being circumferentially spaced apart and having driving parts projecting therefrom arranged on each side of said drive plate driving projecting part, said weights being constructed and arranged in said pockets such that the inertia thereof holds said weights in said pockets out of engagement with said spring when said drive plate is being accelerated below a predetermined speed and such that centrifugal force biases said weights outwardly above a predetermined uniform speed of rotation into engagement with the inner surface of said spring for biasing said spring into driving frictional engagement with the inner surface of said drum for providing a driving connection between said drive plate and said driven member drum through said spring below a predetermined torque.

9. A lag clutch including a drive shaft with an eccentrically arranged drive plate secured thereto and formed with a plurality of circumferentially spaced apart substantially circular pockets therein open to the outer periphery of said plate and having a driving projecting part thereon, a substantially circular weight member loosely arranged in each of said pockets, a driven shaft having a drum secured thereto extending in radially spaced relationship about said drive plate, and an arcuate spring arranged in the radial space between said drive plate and said drum with a slight radial clearance from each, the ends of said arcuate spring being circumferentially spaced apart and having driving parts projecting therefrom arranged on each side of said drive plate driving projecting part, said weights being constructed and arranged in said pockets such that the inertia thereof holds said weights in said pockets to one side and out of engagement with said spring when said drive plate is being accelerated below a predetermined speed and such that centrifugal force biases said weights outwardly above a predetermined uniform speed of rotation into engagement with the inner surface of said spring for biasing said spring into driving frictional engagement with the inner surface of said drum for providing a driving connection between said drive plate and said driven shaft drum through said spring.

10. A lag clutch including a drive shaft with a drive plate secured thereto and formed with a plurality of circumferentially spaced apart pockets therein open to the outer periphery of said plate and having a driving projecting part thereon, a weight member loosely arranged in each of said pockets, a driven shaft having a drum secured thereto extending in radially spaced relationship about said drive plate, and an arcuate spring having a radial width which varies inversely with the circumferential distance from the midpoint circumferentially of the spring arranged in the radial space between said drive plate and said drum with a slight radial clearance from each, the ends of said arcuate spring being circumferentially spaced apart and being arranged on each side of said drive plate driving projecting part, said weights being constructed and arranged in said pockets such that the inertia thereof holds said weights in said pockets to one side and out of engagement with said spring when said drive plate is being accelerated below a predetermined speed and such that centrifugal force biases said weights outwardly above a predetermined uniform speed of rotation into engagement with the inner surface of said spring for biasing said spring into driving frictional engagement with the inner surface of said drum for providing a driving connection between said drive plate and said driven shaft drum through said spring.

11. A lag clutch including a drive shaft with an eccentrically arranged drive plate formed with a plurality of circumferentially spaced apart substantially circular pockets therein open to the outer periphery of said plate and having a driving projecting part thereon, a substantially circular weight member loosely arranged in each of said pockets, a driven shaft having a drum extending in radially spaced relationship about said drive plate and being substantially coaxial with said drive shaft, and an arcuate spring having a radial width which varies inversely with the circumferential distance from the midpoint circumferentially of the spring arranged in the radial space between said drive plate and said drum with a slight radial clearance from each, the ends of said arcuate spring being circumferentially spaced apart and having driving parts projecting therefrom arranged on each side of said drive plate driving projecting part, said weights being constructed and arranged in said pockets such that the inertia thereof holds said weights in said pockets to one side and out of engagement with said spring when said drive plate is being accelerated below a predetermined speed and such that centrifugal force biases said weights outwardly above a predetermined uniform speed of rotation into engagement with the inner surface of said spring for biasing said spring into driving frictional engagement with the inner surface of said drum for providing a driving connection between said drive plate and said driven shaft drum through said spring up to a predetermined maximum torque.

HUGH M. STEPHENSON.